United States Patent [19]
Specht

[11] 3,742,346
[45] June 26, 1973

[54] SURGE GENERATOR FOR TRANSFORMER TESTING

[75] Inventor: Theodore R. Specht, Sharon, Pa.

[73] Assignee: Westinghouse Electric Corporation, Pittsburgh, Pa.

[22] Filed: Aug. 23, 1971

[21] Appl. No.: 173,746

[52] U.S. Cl............... 324/55, 219/113, 324/51
[51] Int. Cl................ G01r 31/02, G01r 31/06
[58] Field of Search.............. 324/51, 55, 54; 315/244, 289, 290, 62; 219/112, 113

[56] References Cited
UNITED STATES PATENTS

| | | | |
|---|---|---|---|
| 2,249,157 | 7/1941 | Morgan et al. | 324/55 |
| 2,356,621 | 8/1944 | Sciaky | 219/112 |
| 3,035,206 | 5/1962 | Fishman et al. | 315/244 |
| 3,243,654 | 3/1966 | Wright | 315/290 X |
| 3,354,387 | 11/1967 | Whaley et al. | 324/55 |
| 3,659,197 | 4/1972 | Alley et al. | 324/51 |

Primary Examiner—Gerard R. Strecker
Attorney—A. T. Stratton and F. E. Browder

[57] ABSTRACT

Apparatus and method for testing short-circuited power transformers. A capacitor, which has been charged to a predetermined voltage, is connected in parallel with an inductor. When the voltage of the discharging capacitor goes through zero, the shorted transformer being tested is connected across the inductor. A matching transformer may be used between the transformer being tested and the inductor for adjusting the surge generator voltage and impedance to match that of the short-circuited power transformer.

7 Claims, 2 Drawing Figures

SURGE GENERATOR FOR TRANSFORMER TESTING

BACKGROUND OF THE INVENTION

1. Field of the Invention

This invention relates, in general, to electrical inductive apparatus and, more specifically, to a method and apparatus for testing short-circuited power transformers.

2. Description of the Prior Art

When a transformer is energized at rated voltage and the secondary of the transformer is short-circuited, very high currents in the order of 10 to 25 times the rated current of the transformer may flow. These currents produce very large mechanical forces within the transformer structure which tend to distort and permanently damage the coils of the transformer. It is important, with the heavily loaded power systems now in use and proposed for the future, that the power transformers used therein be capable of withstanding momentary short-circuit conditions. To assure that a particular power transformer has satisfactory short-circuit capability, and to aid in the engineering design of the transformers, testing procedures have been used to simulate short-circuit power transformer conditions.

Short circuit tests are usually made by energizing a winding of the transformer under test with an alternating current generator while shorting another winding on the transformer. For highly rated power transformers, the size of the alternating current generator becomes excessive and the cost is prohibitive. For a valid test, the generator supplying the energizing power should be rated at least approximately 10 times the KVA rating of the transformer.

An alternative approach to using AC generators for short-circuit testing power transformers makes use of a surge generator. A typical surge generator derives power from an energy storing device which is connected, when charged, to the transformer being tested. The output KVA from a surge generator can be substantially equal to the KVA rating of large rotating generators used for testing; however, the output of the surge generator decays rapidly when compared to rotating test generators. To realize full benefit of the maximum stored energy of the surge generator, the secondary winding of the power transformer is usually shorted before power is applied to the primary winding. Although this procedure permits sufficient time to energize the transformer for testing purposes, the waveform of the applied voltage may not be optimum for a true short-circuit test.

The largest currents flow in the windings of a transformer when the secondary winding is short-circuited at the instant when the applied AC voltage to the transformer goes through zero. Although it may occur a fraction of a cycle later, the short-circuit current produced when shorted at the "optimum" or the severest instant may be nearly twice the amount of the steady-state AC short-circuit current. Since it is impractical to short-circuit the transformer after the surge generator has been connected thereto, it is desirable to connect the surge generator to the previously shorted transformer at the proper instant.

Therefore, it is desirable, and it is an object of this invention, to provide a surge generator for testing short-circuited transformers which subjects the transformer to the severest electrical conditions which may be encountered in actual service.

SUMMARY OF THE INVENTION

There is disclosed a new and useful surge generator for testing short-circuited power transformers. A capacitive energy storing means is charged to a predetermined voltage. An inductive means is then connected in parallel circuit relationship with the capacitive energy storing means causing the voltage across the parallel combination to oscillate. After 90° of the cycle, when the voltage is zero, the short-circuited power transformer being tested is connected in parallel across the inductor. A matching transformer may be placed between the power transformer and the inductor to increase the versatility of the surge generator. Since the power transformer is shorted when it is connected to the inductor, and since the voltage across the inductor is zero at this same instant, the short is effectively applied to the power transformer when the energizing voltage is zero. Thus, the severest short-circuit tests can be provided by surge generator apparatus constructed according to the teachings of this invention instead of by large and expensive AC generators.

DESCRIPTION OF THE PREFERRED EMBODIMENTS

Figure 1:
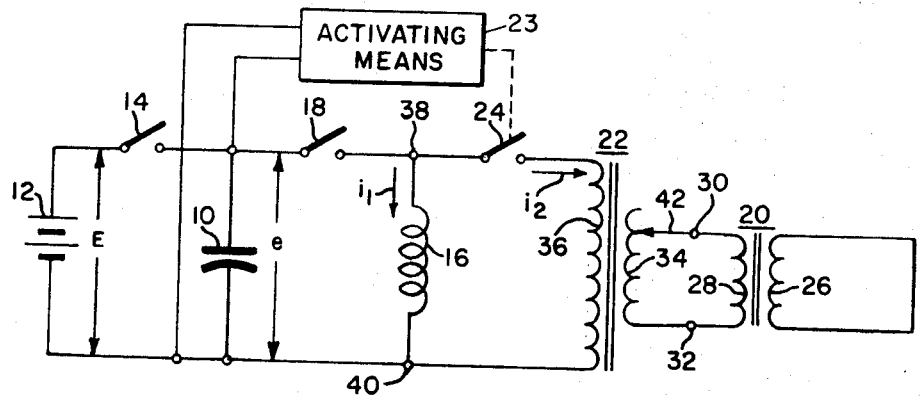
FIG. 1 is an electrical schematic diagram of a surge generator constructed according to the teachings of this invention.

Throughout the following description, similar reference characters refer to similar quantities in all figures of the drawing.

Referring now to the drawing, and FIG. 1 in particular, there is shown an electrical schematic of a surge generator constructed according to the teachings of this invention. A capacitive energy storing means, such as the capacitor 10, is connected in parallel with an energy supplying means, such as the battery 12. A switch 14 is provided between the battery 12 and the capacitor 10 so that the battery 12 may be disconnected from the capacitor 10 when it becomes charged sufficiently. An inductive means, such as the inductor 16, is connected, through a switch 18, in parallel with the capacitor 10. The power transformer 20 being tested is connected in parallel, through the "booth" or matching transformer 22 and a switch 24, to the inductor 16. The winding 26 of the transformer 20 is short-circuited and the winding 28 is connected, through the output terminals 30 and 32, to the tapped winding 34 of the matching transformer 22. The winding 36 of the matching transformer 22 is connected in parallel with the inductor 16 when the switch 24 is closed.

In general, the switch 14 is closed to charge the capacitor 10 to a predetermined voltage. The switch 14 is then opened to remove the battery 12 from the circuit. The switch 18 is closed to produce a current flowing through the capacitor 10 and the inductor 16. Because of the reactive impedance furnished by the capacitor 10 and by the inductor 16, an oscillating current tends to develop. At approximately the instant the voltage of the capacitor 10 first goes to zero during the oscillation, the switch 24 is closed and connects the transformers 22 and 20 into the circuit. The voltage on the capacitor 10 is then placed across the winding 36 of the transformer 22 which effectively energizes the winding 28 of the short-circuited transformer 20.

The voltage of the battery 12 must be sufficiently high to allow charging of the capacitor 10 to the proper predetermined value. The proper value of the voltage of the capacitor 10 is determined by the voltage which is desired to be applied to the transformer 20 and by the voltage ratio between the windings 36 and 34 of the transformer 22. The capacitor 10 must have sufficient capacitance to develop satisfactory current with the charged voltage. That is, the charge on the capacitor 10 must be sufficient to supply the energy required for the surge test.

The inductance of the inductor 16 should be sufficient to produce an oscillation frequency sufficiently high to drop the voltage of the capacitor 10 through zero in a short period of time, preferably a fraction of a second. The switch 24 is synchronized to close when the capacitor voltage is zero. This can be accomplished by a timing mechanism which closes the switch 24, after the switch 18 closes, in a time interval equal to one-fourth of the period of the oscillation frequency of the capacitor 10 and the inductor 16. Any other suitable means may be used, such as a means 23 which senses the capacitor voltage and closes the switch 24 when the capacitor voltage is approximately zero. The synchronizing means is required only to close the switch 24 at the proper time. Opening the switch 24 is not part of the normal operation of the surge generator. It is also within the contemplation of this invention that the switch 24 may be closed at any instant during the oscillation when the voltage of the capacitor 10 is zero, that is, either at the first time the voltage of the capacitor 10 is zero or at a subsequent time when the voltage of the capacitor 10 goes through zero.

The matching transformer 22 may be omitted from the circuit of the surge generator by connecting the winding 28 of the transformer 20 directly to the switch 24 and to the inductor 16. However, to make the surge generator versatile and adaptable for use with power transformers having various voltage ratings, the matching transformer 22 is used to transform the surge voltage to the rated voltage of the transformer 20 being tested. The matching transformer 22 also reflects the impedance of the power transformer 20 into the parallel circuit around the inductor 16. That is, the impedance between the terminals 38 and 40 of the inductor 16, with the switch 24 closed, is equal to the parallel impedance formed by the inductance of the inductor 16 and the reflected inductance and resistance of the power transformer 20. Under short-circuit conditions, the impedance looking into a transformer has a resistive as well as a reactive component. Thus, the total impedance between the terminals 38 and 40, with the switch 24 closed, has components due to resistance and inductance. To optimize the size of the capacitor required to furnish the desired electrical energy, the inductance of the inductor 16 should be equal to the inductance which exists looking into the winding 36 of the transformer 22.

Several different procedures may be used to set-up and adjust the test apparatus. One procedure would involve shorting the winding 26 of the transformer 20 and connecting the winding 28 to the output terminals 30 and 32. The tap selector 42 would be adjusted so that the turns ratio of the transformer 22 is proper to reflect the inductance of the power transformer 20 to a value equal to the inductance of the inductor 16. The capacitance of the capacitor 10 is selected to resonate the tank circuit comprising the capacitor 10, the inductor 16 and the inductance looking into the winding 36 of the transformer 22. Ordinarily, the resonant frequency would be 60 Hertz since most power transformers are rated at this frequency, however, other frequencies may be used. Since the inductance which is in parallel with the capacitor 10 before the switch 24 is closed is one-half of the inductance after the switch 24 is closed, the oscillating frequency of the capacitor 10 and the inductor 16 is equal to 0.707 times the desired (60 Hertz) frequency. Consequently, the capacitor 10 discharges at a slower rate with the switch 24 open than when the switch 24 is closed. The capacitor 10 is charged to a voltage which will, when transformed through the matching transformer 22, apply the rated voltage to the input winding 28 of the power transformer 20 which is being tested.

Figure 2:
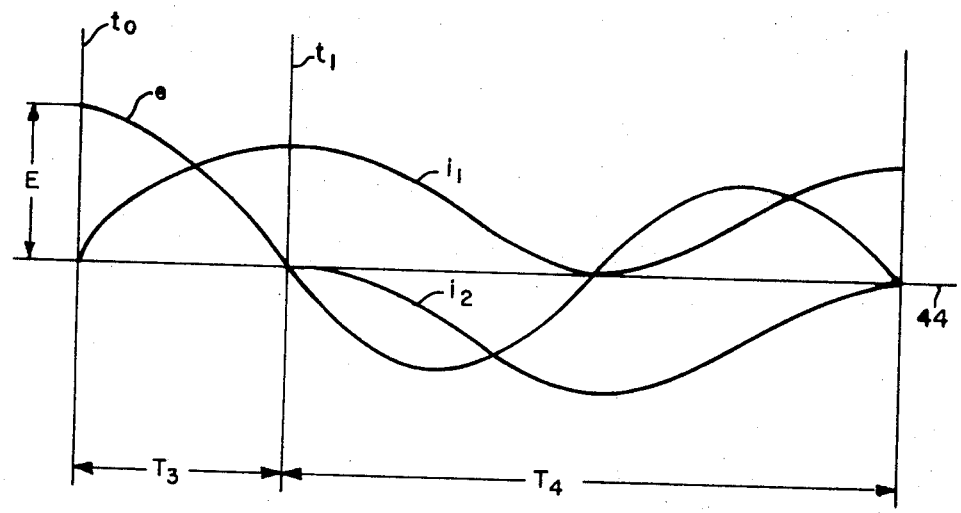
FIG. 2 is a view illustrating waveforms of electrical variables in the surge generator of FIG. 1.

A graphical representation of the important currents and voltages involved is represented in FIG. 2. The curves are plotted along the time axis 44 with the curve $e$ representing the voltage across the capacitor 10, the curve $i_1$ representing the current through the inductor 16, and the current $i_2$ representing the current through the winding 36 of the matching transformer 22. Since the current $i_2$ is proportional to the current in the transformer 20, the current $i_2$ represents the current of the power transformer 20 as though it was connected directly to the inductor 16 without using the matching transformer 22.

With conventional AC generator short-circuit testing, the short would be applied, or the generator applied to a shorted transformer, at the instant $t_1$ which represents the worst instant a short could occur. The current in the winding 28 of the shorted power transformer is the same as the current during this surge test, that is, the current $i_2$ multiplied by the ratio of the matching transformer 36. This current has a DC component with an initial value equal to the peak value of the AC component, giving a total crest value of current equal to twice the crest of the AC component.

Referring to FIGS. 1 and 2, after the switch 14 is opened, a voltage E exists across the capacitor 10. When the switch 18 is closed, the instantaneous voltage $e$ across the capacitor 10 and the inductor 16 begins to decrease while the current $i_1$ in the inductor 16 increases. After the period $t_3$, the voltage $e$ goes through zero and the current $i_1$ in the inductor 16 reaches its maximum value. At the instant $t_1$, the switch 24 is closed to connect the transformer 20, by way of the transformer 22, to the energy source. The transformer 20 is thus applied to the surge generator voltage at the instant which would be most damaging to the transformer 20. The frequency of the period $t_4$ would be governed by the impedances involved and should, for a valid test, be the same as the rated frequency of the transformer being tested. Means to disconnect the generator or open the shorted winding 26 of the transformer 20 after a predetermined number of cycles may be desirable to reduce the effects of the high currents induced during the tests. For example, the standard short circuit test may be for ten cycles, after which time the test voltage or the short-circuit is removed.

There has been described apparatus and procedure for performing short-circuit tests on power transformers without the necessity of having large and costly AC generating devices. Since numerous changes may be made in the above described apparatus and procedure and different embodiments of the invention may be made without departing from the spirit thereof, it is intended that all of the matter contained in the foregoing description, or shown in the accompanying drawing, shall be interpreted as illustrative rather than limiting.

I claim as my invention:

1. A surge generator for testing a transformer having windings, said surge generator comprising capacitive means and inductive means, means for connecting said capacitive means and said inductive means in parallel circuit relationship, means for charging said capacitive means, means for discharging said capacitive means through said inductive means, and connecting means operable to connect said inductive means in parallel circuit relationship to a winding of the transformer when the voltage on the capacitive means is approximately zero to provide a voltage across said winding which is proportional to the voltage across the inductive means.

2. The surge generator of claim 1 wherein the capacitive means comprises a capacitor, and the means for charging the capacitor comprises a source of direct current potential having means for connecting and disconnecting said source of direct current potential to said capacitor.

3. The surge generator of claim 1 wherein the inductive means which is connected in parallel circuit relationship with the capacitive means comprises an inductor having means for connecting and disconnecting said inductor to said capacitive means.

4. The surge generator of claim 1 wherein the winding of the transformer being tested is connected to a first winding of a matching transformer, said matching transformer having a second winding which is connected in parallel circuit relationship with the inductive means.

5. The surge generator of claim 1 wherein a winding of the transformer being tested is shorted.

6. A method of providing a surge voltage in a winding of a transformer, said method comprising the steps of charging a capacitive energy storing means, connecting the charged capacitive energy storing means to an inductive means, and connecting a winding of the transformer being tested to the inductive means when the voltage on the capacitive energy storing means is substantially zero.

7. The method of providing a surge voltage in a winding of a transformer of claim 6 wherein the step of charging the capacitive energy storing means comprises connecting a direct current potential source in parallel with the capacitive energy storing means until the desired charge is obtained and then disconnecting the direct current potential source from the capacitive energy storing means.

* * * * *